US012422566B2

(12) United States Patent
Wang et al.

(10) Patent No.: US 12,422,566 B2
(45) Date of Patent: Sep. 23, 2025

(54) INTEGER AMBIGUITY VALIDATION WITH MACHINE LEARNING

(71) Applicant: QUALCOMM Incorporated, San Diego, CA (US)

(72) Inventors: Min Wang, Tustin, CA (US); Songwon Jee, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 350 days.

(21) Appl. No.: 18/334,837

(22) Filed: Jun. 14, 2023

(65) Prior Publication Data

US 2024/0418869 A1    Dec. 19, 2024

(51) Int. Cl.
   *G01S 19/44*    (2010.01)
(52) U.S. Cl.
   CPC .................. *G01S 19/44* (2013.01)
(58) Field of Classification Search
   CPC .......................................... G01S 19/44
   USPC ............................................. 342/352
   See application file for complete search history.

(56) References Cited

U.S. PATENT DOCUMENTS 10,338,233 B2 * 7/2019 Green .................. G01S 19/396

FOREIGN PATENT DOCUMENTS

| CN | 110109166 A | * | 8/2019 | ............. G01S 19/44 |
| CN | 115047497 A | * | 9/2022 | ............. G01S 19/37 |
| WO | WO-2022051235 A2 | * | 3/2022 | ............... G01S 5/10 |

* cited by examiner

*Primary Examiner* — Harry K Liu
(74) *Attorney, Agent, or Firm* — Thien T. Nguyen

(57) ABSTRACT

An integer ambiguity validation method includes: obtaining, at an apparatus in conjunction with the one or more receivers, a plurality of feature values that are based on satellite signals received by a mobile device; determining, at the apparatus, an integer ambiguity vector indicative of integer numbers of carrier phase cycles of the satellite signals between the apparatus and respective satellites; determining, at the apparatus, a probability of the integer ambiguity vector being correct by using the integer ambiguity vector in a machine learning algorithm; and determining, at the apparatus, whether the integer ambiguity vector is correct based on the probability of the integer ambiguity vector being correct and an integer ambiguity vector probability threshold.

24 Claims, 11 Drawing Sheets

INTEGER AMBIGUITY VALIDATION WITH MACHINE LEARNING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example apparatus includes: one or more memories; one or more receivers; and one or more processors communicatively coupled to the one or more memories and the one or more receivers, the one or more processors being configured to: obtain, in conjunction with the one or more receivers, a plurality of feature values that are based on satellite signals received by a mobile device; determine an integer ambiguity vector indicative of integer numbers of carrier phase cycles of the satellite signals between the apparatus and respective satellites; determine a probability of the integer ambiguity vector being correct by using the integer ambiguity vector in a machine learning algorithm; and determine whether the integer ambiguity vector is correct based on the probability of the integer ambiguity vector being correct and an integer ambiguity vector probability threshold.

An integer ambiguity validation method includes: obtaining, at an apparatus in conjunction with the one or more receivers, a plurality of feature values that are based on satellite signals received by a mobile device; determining, at the apparatus, an integer ambiguity vector indicative of integer numbers of carrier phase cycles of the satellite signals between the apparatus and respective satellites; determining, at the apparatus, a probability of the integer ambiguity vector being correct by using the integer ambiguity vector in a machine learning algorithm; and determining, at the apparatus, whether the integer ambiguity vector is correct based on the probability of the integer ambiguity vector being correct and an integer ambiguity vector probability threshold.

Another example apparatus includes: means for obtaining, in conjunction with the one or more receivers, a plurality of feature values that are based on satellite signals received by a mobile device; means for determining an integer ambiguity vector indicative of integer numbers of carrier phase cycles of the satellite signals between the apparatus and respective satellites; means for determining a probability of the integer ambiguity vector being correct by using the integer ambiguity vector in a machine learning algorithm; and means for determining whether the integer ambiguity vector is correct based on the probability of the integer ambiguity vector being correct and an integer ambiguity vector probability threshold.

An example non-transitory, processor-readable storage medium includes processor-readable instructions to cause one or more processors, of an apparatus, to: obtain, in conjunction with the one or more receivers, a plurality of feature values that are based on satellite signals received by a mobile device; determine an integer ambiguity vector indicative of integer numbers of carrier phase cycles of the satellite signals between the apparatus and respective satellites; determine a probability of the integer ambiguity vector being correct by using the integer ambiguity vector in a machine learning algorithm; and determine whether the integer ambiguity vector is correct based on the probability of the integer ambiguity vector being correct and an integer ambiguity vector probability threshold.

DETAILED DESCRIPTION

Figure 1:
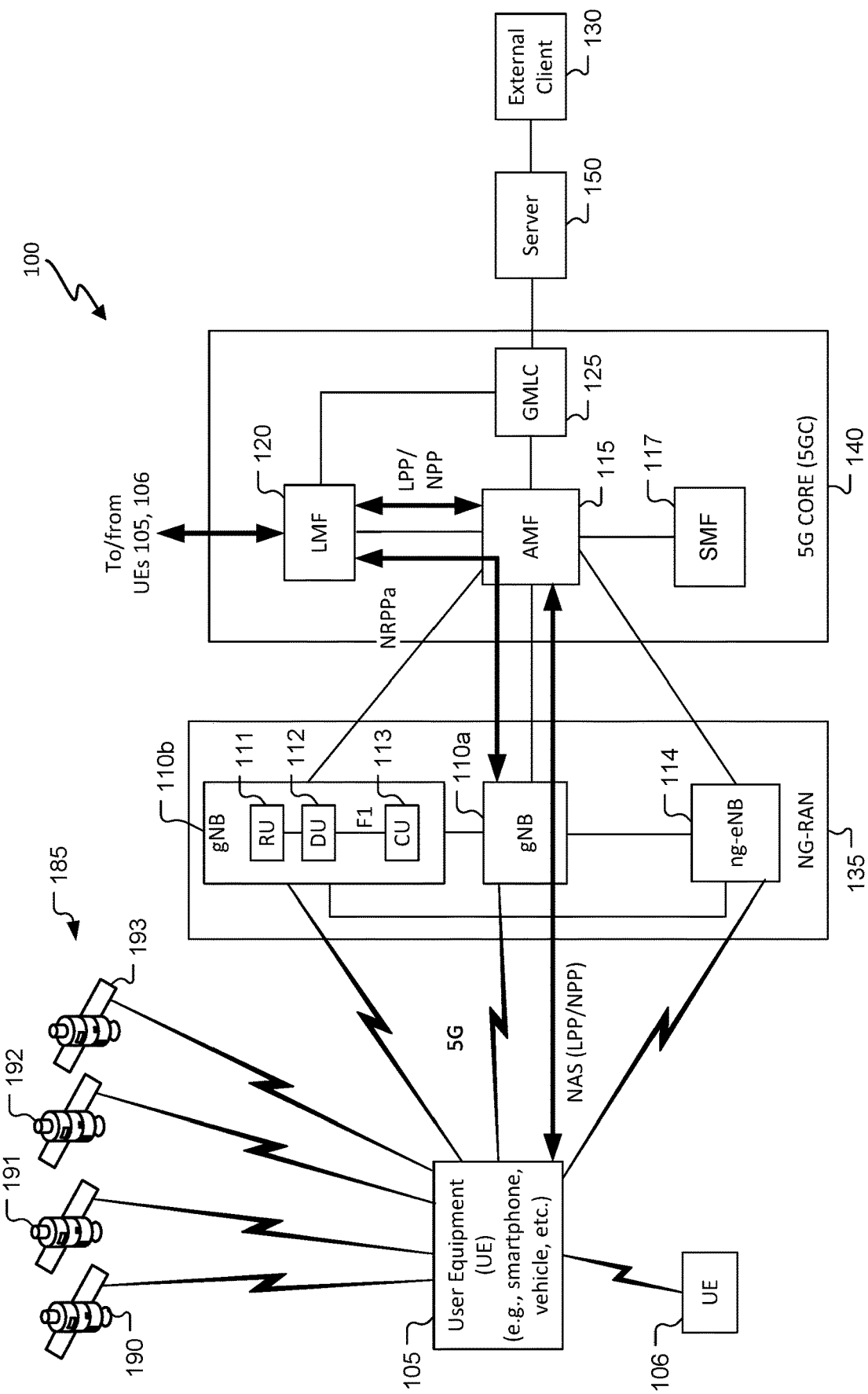
FIG. 1 is a simplified diagram of an example wireless communications system.

Techniques are discussed herein for validating an integer ambiguity fix. An ML-based (machine-learning-based) technique may be used for integer ambiguity resolution/validation. A non-learning approach to ambiguity validation is currently being used to reduce the impact from an incorrect ambiguity fix. However, this algorithm-based method keeps growing with additional logical tests, which results in an increasing challenge to maintain/tune the threshold for each logical test and adds more complexity for different combinations of logical tests. ML-based techniques are discussed for integer ambiguity validation that may improve performance while avoiding complexity. A machine learning model may be trained to provide a prediction of a probability that an fixed integer ambiguity vector (for precise positioning) is correct. The determined probability may be compared against a probability threshold. If the determined probability meets or exceeds the probability threshold, then the fixed integer ambiguity vector may be determined (labeled) to be correct. If the determined probability is below the probability threshold, then the fixed integer ambiguity vector may be determined (labeled) to be incorrect. Other configurations, however, may be used.

Items and/or techniques described herein may provide one or more of the following capabilities, as well as other capabilities not mentioned. By providing and comparing a probability of correctness of a fixed integer ambiguity vector with a probability threshold to conclude whether the fixed integer ambiguity vector is correct, a desired balance between fixing rate and incorrect fix rate may be achieved. By implementing a machine-learning-based ambiguity validation, a correctness of a fixed integer ambiguity vector may be determined with more accuracy and/or with a better fixing rate than with a non-learning approach. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a. 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices. e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111. DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT. Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a. 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP. RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
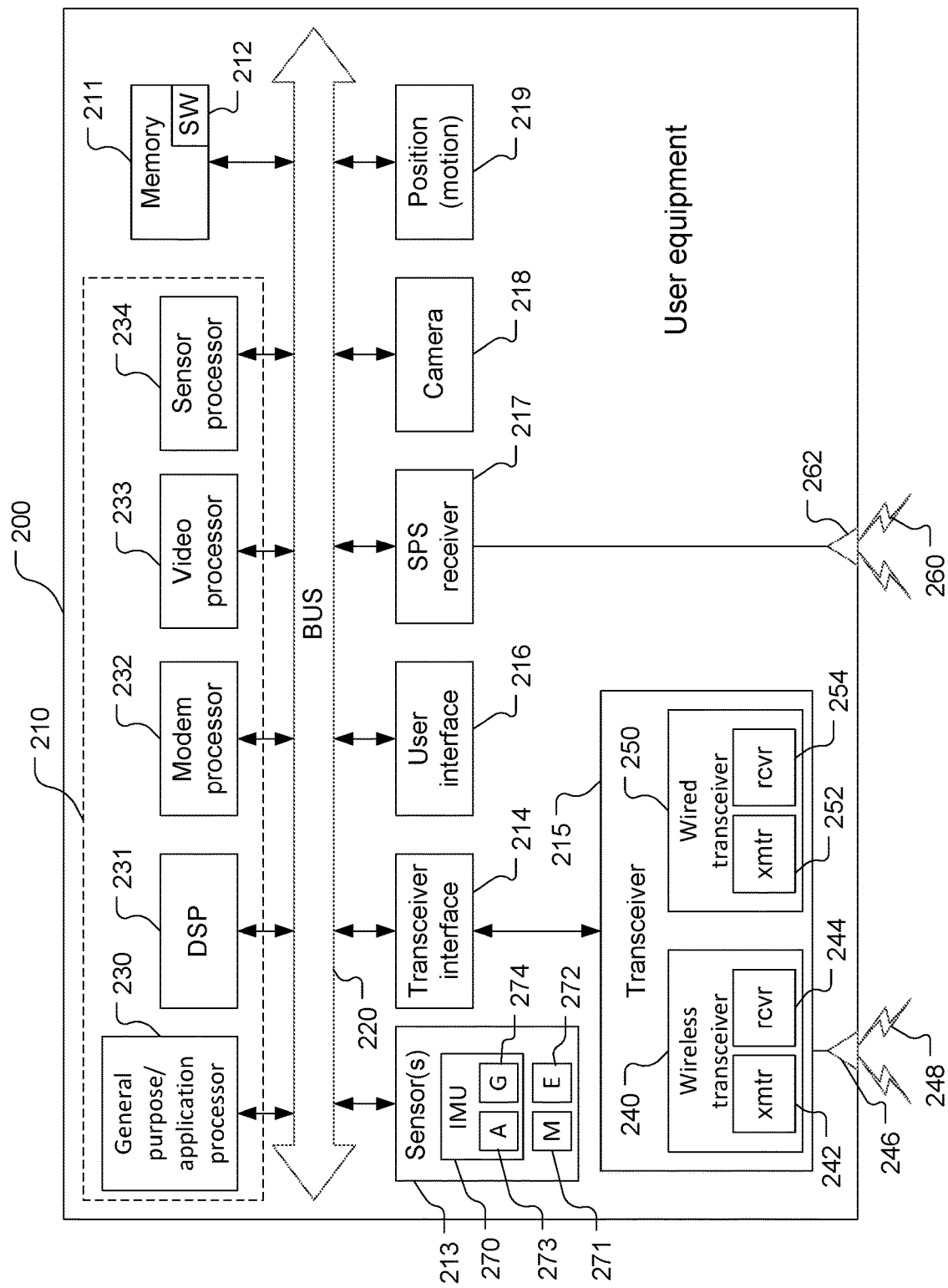
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
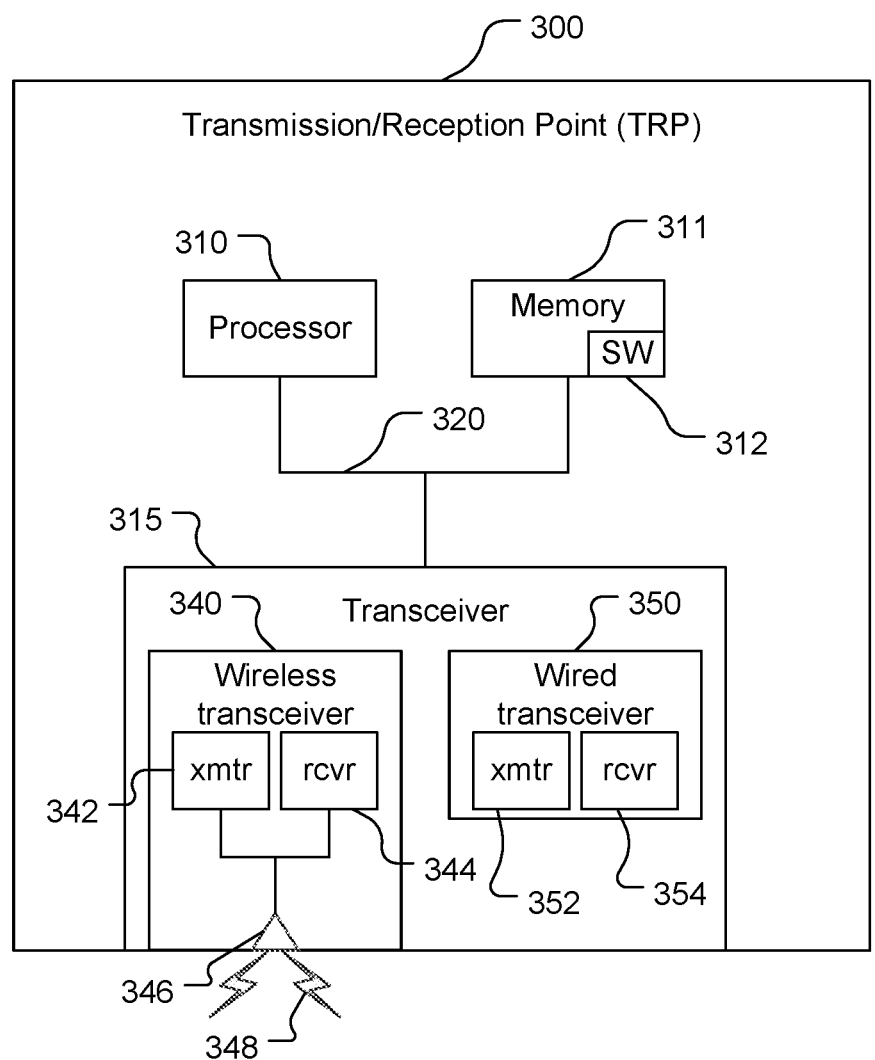
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
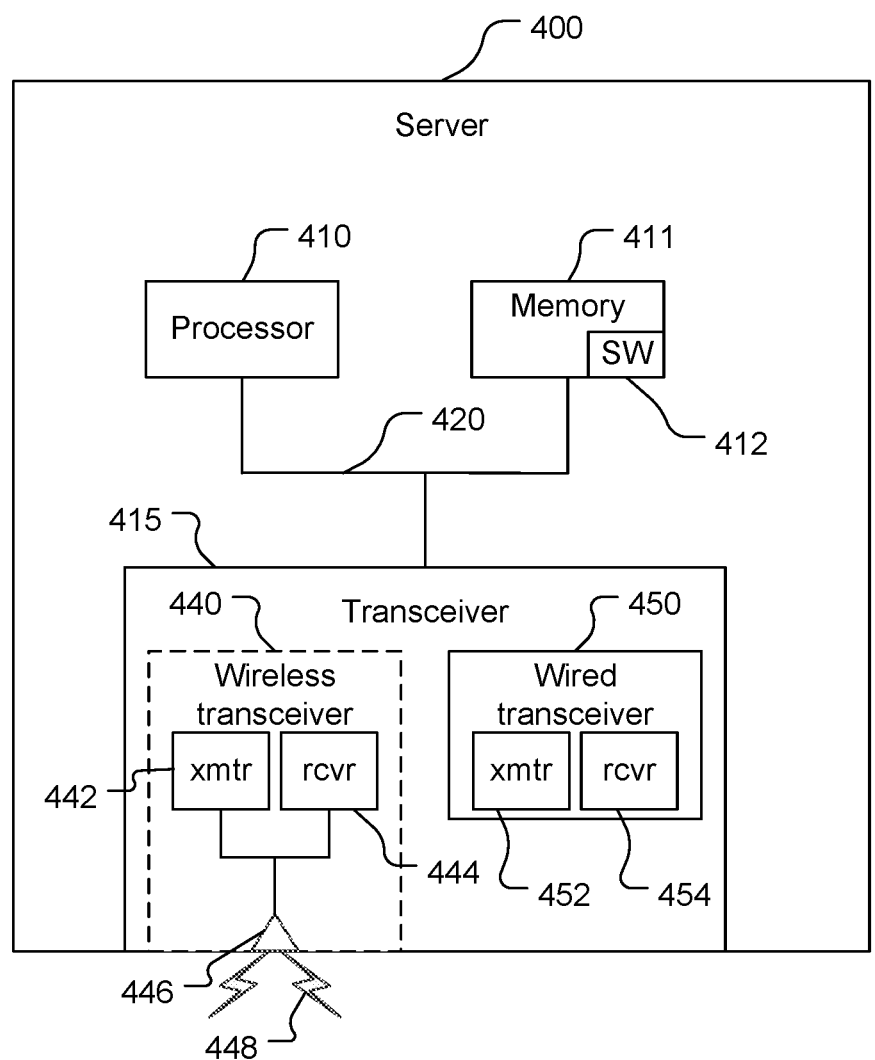
FIG. 4 is a block diagram of components of an example server, various embodiments of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Machine-Learning-Based Positioning

A GNSS receiver may measure satellite vehicle signals (SV signals) to determine a location of the GNSS receiver. For example, a UE may measure times of arrival of codes in SV signals and estimate a location, or provide measurement information to another device such as a location server that estimates a location, of the UE using the times of arrival. The location of the UE may be more-accurately determined using carrier-phase measurements of the SV signals and one or more positioning techniques such as RTK or PPP. Machine learning may be applied to carrier-phase positioning techniques, which may improve a rate of determining a position of the UE using a carrier-phase positioning technique and/or an accuracy of a position determined using a carrier-phase positioning technique.

Figure 5:
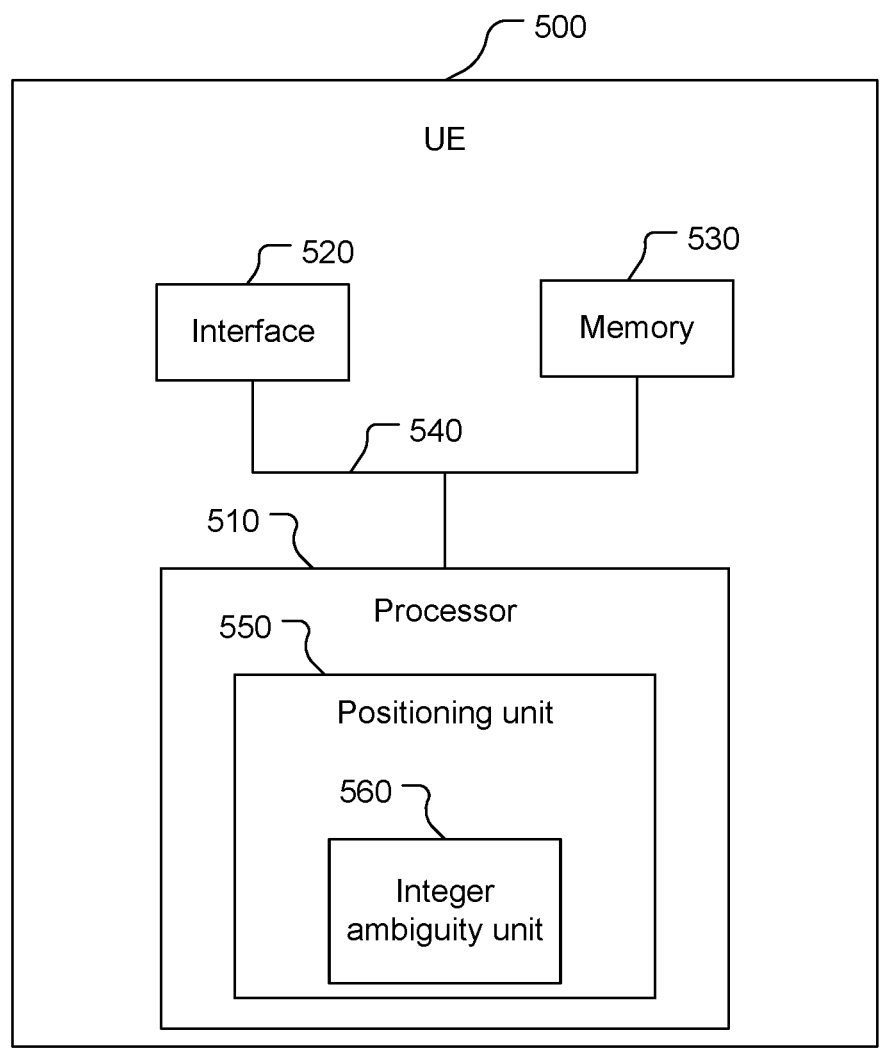
FIG. 5 is a simplified diagram of an example user equipment.

Referring to FIG. 5, with further reference to FIGS. 1-4, a UE 500 includes a processor 510, an interface 520, and a memory 530 communicatively coupled to each other by a bus 540. Even if referred to in the singular, the processor 510 may include one or more processors, the interface 520 may include one or more transceivers (e.g., one or more transmitters and/or one or more receivers), and the memory 530 may include one or more memories. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a positioning unit 550 that includes an integer ambiguity unit 560. The configuration and functionality of the positioning unit 550 including the integer ambiguity unit 560 is discussed further herein, with the processor 510 being configured to perform the functionality described as being performed by the positioning unit 550 including the integer ambiguity unit.

Figure 6:
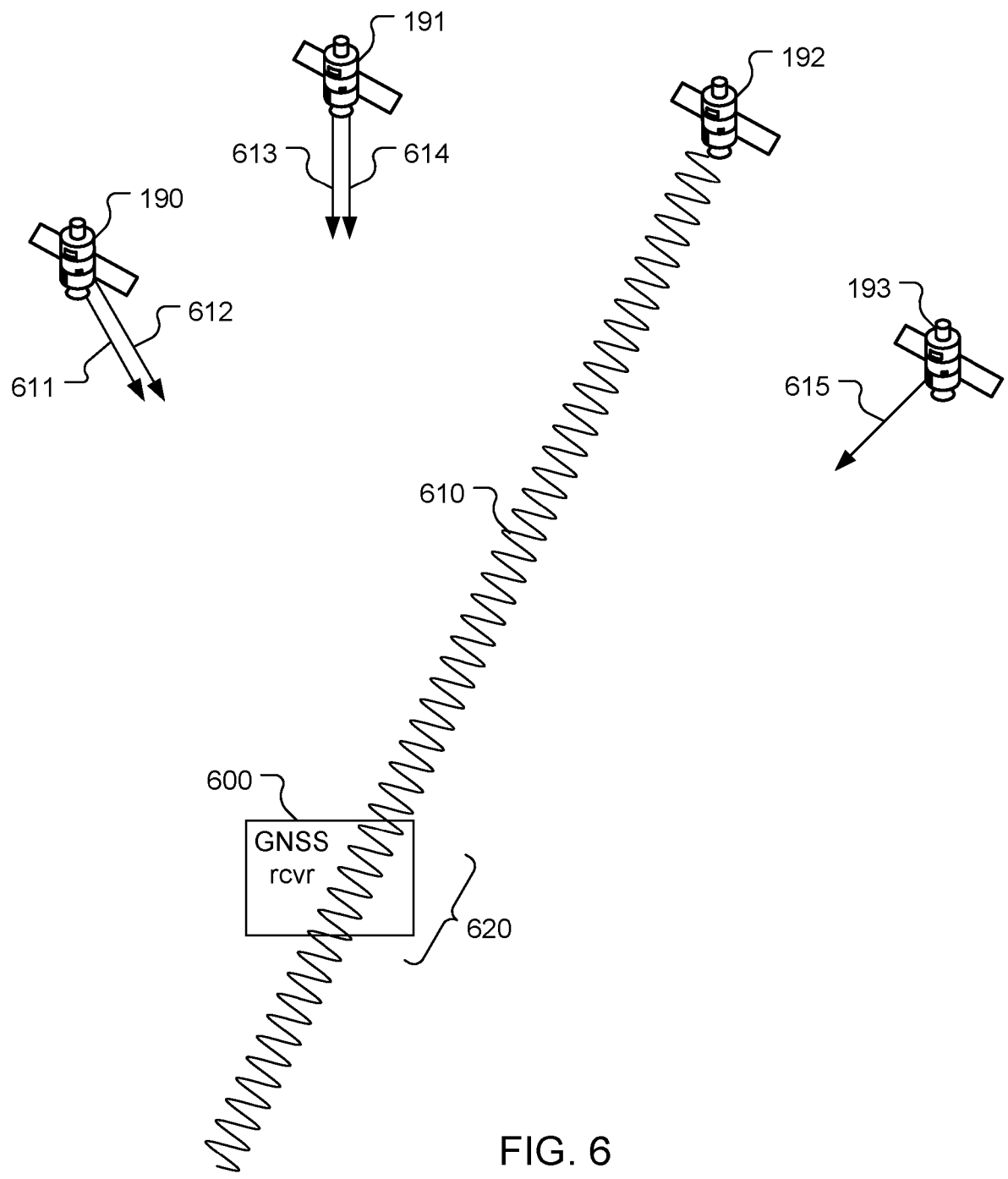
FIG. 6 is a simplified view of satellite signals, including a carrier, transmitted from satellites to a receiver.

Referring also to FIG. 6, code-phase measurements and carrier-phase measurements may be used to determine location of a target UE with high precision. A carrier signal is produced by a satellite, e.g., the SV 192 (FIG. 1). The carrier signal (also called a carrier wave or a carrier) is a waveform used for modulation with a modulation signal to produce a new signal. Here, a PRN code signal (pseudorandom noise code signal) is used by the SV 190 to modulate the carrier signal to produce an SV signal (satellite vehicle signal), which comprises the PRN code signal and the carrier signal. In FIG. 6, only a carrier signal 610 of the SV signal from the SV 192 is shown. The SVs 190, 191, 193 may each transmit one or more respective SV signals, here SV signals 611, 612, 613, 614, 615. The SVs 190, 191 in this example transmit multi-band signals, with the signals 611, 612 being in different frequency bands (e.g., L1 and L5) and the signals 613, 614 being in different frequency bands (e.g., L1 and L5). Satellite signals from satellites in different satellite constellations may be received and measured by a GNSS receiver 600, e.g., to determine a position estimate. Thus, one or more of the SVs 190-193 may be in a different constellation than one or more other SVs of the SVs 190-193.

The SV 192 transmits the SV signal to the GNSS receiver 600 (e.g., the UE 200), although only the carrier signal 610 of the SV signal is shown in FIG. 6. The GNSS receiver 600 (e.g., the processor 510) may correlate the PRN code signal with a stored PRN code corresponding to the SV 192 to determine a time of arrival of the PRN code signal. The GNSS receiver 600 may use the time of arrival to determine a time of travel between the SV 192 and the GNSS receiver 600 to determine a distance between the SV 192 and the GNSS receiver 600. The distance determined using the PRN code signal typically has an error of at least several meters (e.g., 5 m, 10 m, or more). If, however, the GNSS receiver 600 can determine the total carrier phase of the carrier signal 610 (i.e., the number of full carrier signal cycles plus the fractional carrier phase) between the SV 192 and the GNSS receiver 600, then the GNSS receiver can determine the distance between the SV 192 and the GNSS receiver 600 much more accurately. e.g., within centimeters. The GNSS receiver 600, e.g., the positioning unit 550, may measure the instantaneous phase of the carrier signal 610 at the GNSS receiver 600, and use this measured phased to determine the fractional phase of the carrier signal 610 between the SV 192 and the GNSS receiver 600. The GNSS receiver 600 cannot measure the total phase of the carrier signal 610 between the SV 192 and the GNSS receiver 600, but can use one or more known techniques to determine the unknown number of full cycles of the carrier signal 610 between the SV 192 and the GNSS receiver 600. The unknown integer number of full cycles of the carrier signal 610 between the SV 192 and the GNSS receiver 600 is referred to as the GNSS integer ambiguity. Examples of techniques for solving the integer ambiguity include searching through possible integer solutions and choosing the solution with the lowest residuals, using carrier phase measurements from multiple epochs and satellite geometry (e.g., multiple satellite constellations) to estimate the GNSS receiver location, or averaging multiple independent measurements to an estimated position with the lowest noise level. Various known search techniques, such as the LAMBDA search, may be used to search through possible integer solutions and choosing the solution with the lowest residuals.

For carrier-phase-based positioning, a distance (also called a range) from a source of a carrier signal to a receiver of the carrier signal is determined as the total carrier phase (the number of cycles, including a partial cycle (if any)) between the source and receiver multiplied by the wavelength, $\lambda$, of the carrier signal. The total carrier phase can be represented as an integer number N of full cycles between the source and receiver plus a fractional carrier phase $\theta$ divided by $2\pi$. The fractional carrier phase $\theta$ is given by $$\theta = \theta(t) - \theta_0 \qquad (1)$$

where $\theta_0$ is the initial carrier phase at the transmitter (carrier signal source) and $\theta(t)$ is the carrier phase measured at the receiver. Thus, the distance $\rho$ may be given by $$\rho = \left(N + \frac{\theta(t) - \theta_0}{2\pi}\right) * \lambda \qquad (2)$$

The initial phase component can be removed from consideration by employing a double-difference technique using a reference node to measure the same satellite signal as measured by the GNSS receiver. The distance may thus be determined based on the measured phase and determination of the integer number of cycles of the carrier signal 610 between the source (e.g., the SV 192) and the GNSS receiver 600. Although called a GNSS receiver, the GNSS receiver 600 may be configured to operate according to an SPS other than the Global Navigation Satellite System.

Based on the distance between the SV 192 and the GNSS receiver 600 determined using the PRN code signal, the number of full cycles of the carrier signal 610 may be narrowed to a range 620 of possible numbers of full cycles. To determine the total carrier phase between the SV 192 and the GNSS receiver 600, the GNSS receiver 600 may use the distance determined using the PRN code signal to set a search region, referred to as the GNSS integer ambiguity search space, for an algorithm to determine the integer number of carrier signal cycles between the SV 192 and the GNSS receiver 600. Determining a search space helps simplify the determination of the number of full cycles of the carrier signal 610, and helps the GNSS receiver 600 be able to determine the integer solution. If the GNSS receiver 600 can reduce the size of the search space (i.e., the length of the range 620) for the actual integer number of cycles to the GNSS receiver 600, then the time to solve the integer ambiguity may be decreased, and/or a solution to the integer ambiguity may be determined under conditions (e.g., SV signal multipath such as in urban canyons) in which a solution may not be possible absent reduction of the search space.

Figure 7:
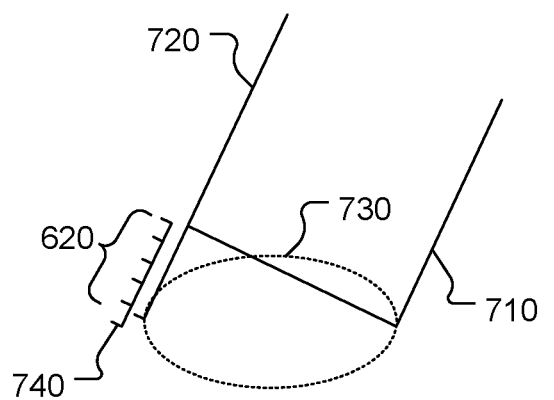
FIG. 7 is a simplified diagram of a carrier signal phase integer ambiguity and integer ambiguity search space.

Referring also to FIG. 7, the distance determined by correlating the PRN code, and an uncertainty in this distance, can be used to determine a minimum distance 710 from the SV 192 to the GNSS receiver 600 and a maximum distance 720 from the SV 192 to the GNSS receiver 600. The range 620 corresponds to the difference between the maximum distance 720 and the minimum distance 710 and spans several cycles of the carrier signal 610 indicated by a scale 740. A two-dimensional position error ellipse 730 defines the minimum distance 710 and the maximum distance 720. The two-dimensional position error ellipse 730 is the projection of a three-dimensional position error ellipsoid of the position of the GNSS receiver 600 based on GNSS signals (although error volumes of shapes other than ellipsoids (e.g., irregular shapes) and/or two-dimensional projections of shapes other than ellipses may be used). The projection of the two-dimensional position error ellipse 730 onto the satellite line of sight to the GNSS receiver 600 (e.g., the line of the maximum distance 720) yields the range 620, the length of which is the search space.

The positioning unit 550, e.g., the integer ambiguity unit 560 may, for example, be configured to fix an integer ambiguity to determine a position estimate for the UE 500 using one or more precise positioning techniques, e.g., PPP and/or RTK. Fixing the integer ambiguity may provide improved horizontal error (HE) and/or reduced convergence time (time to converge on a position solution) compared to using a float value for the number of carrier phase cycles between SV and receiver. If, however, an incorrect integer ambiguity fix is determined, then the positioning unit 550 may produce an undesired position estimate, e.g., with a small Horizontal Estimated Position Error (HEPE; essentially, uncertainty) but a large HE. Further, an incorrect integer ambiguity fix may have a negative impact on a positioning solution for a significant amount of time, e.g., over a hundred epochs.

Figure 8:
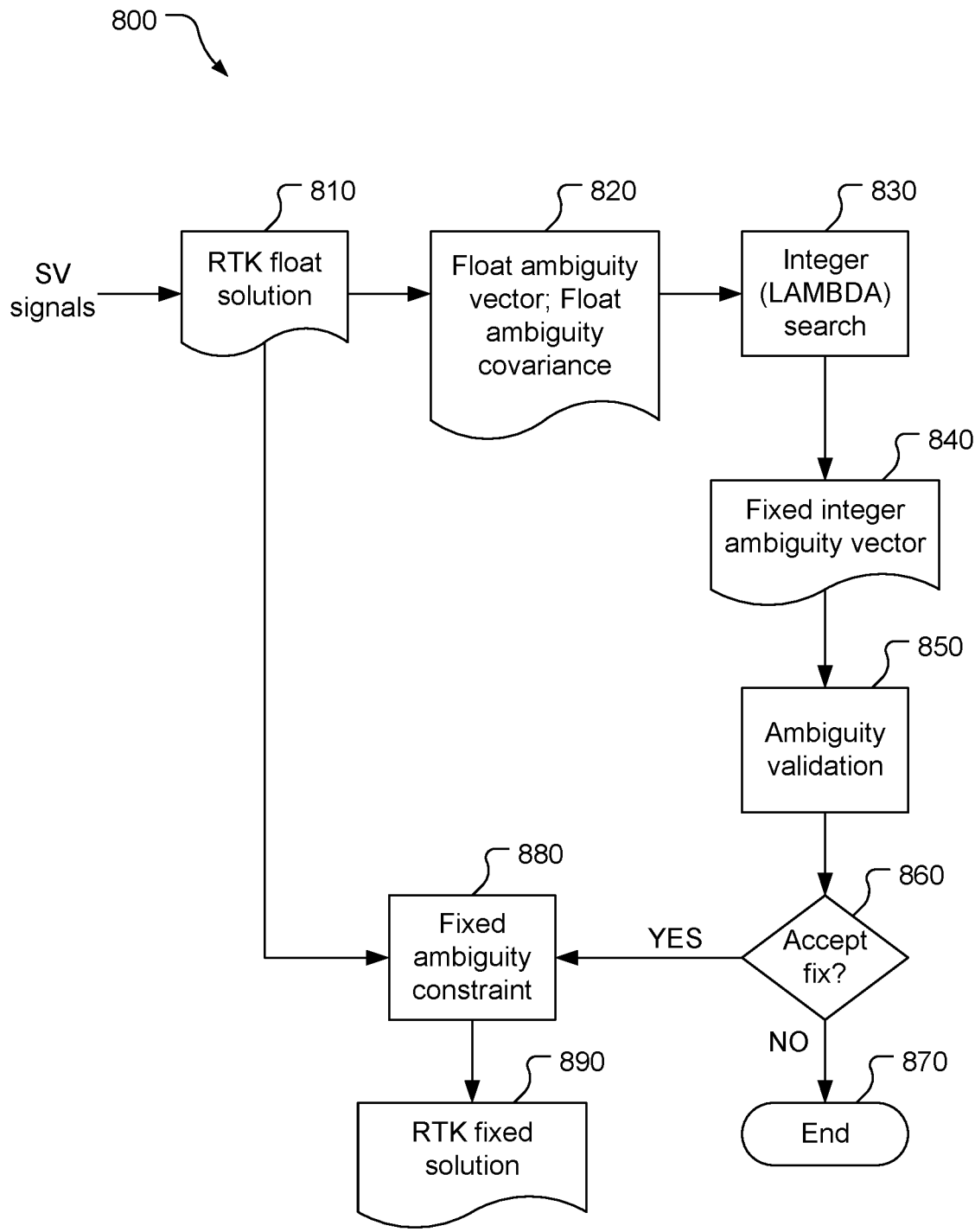
FIG. 8 is a flow diagram of a method of determining an Real Time Kinematic fixed solution.

Referring also to FIG. 8, a method 800 of determining an RTK fixed solution includes the stages shown. The method 800 is, however, an example only and not limiting. The method 800 may be altered, e.g., by having stages added, removed, rearranged, combined, performed concurrently, and/or having single stages split into multiple stages.

The method 800 includes providing an RTK float solution 810. For example, the positioning unit 550 may determine the RTK float solution 810 from SV signal measurements. The RTK float solution 810 is a position estimate for the UE 500 determined without resolving the integer ambiguities in the carrier phase measurements. The RTK float solution 810 may have, for example, centimeter-level accuracy in the position estimate. A float ambiguity vector and a float ambiguity covariance 820 may be determined corresponding to the RTK float solution 810 and used by the integer ambiguity unit 560 to perform an integer ambiguity search (e.g., a LAMBDA search in which code phase is adjusted in small increments and the received signal compared with a replica signal) at stage 830. The (integer ambiguity search) stage 830 yields a fixed integer ambiguity vector 840.

At stage 850, the integer ambiguity unit 560 may perform an ambiguity validation for use in determining whether the fixed integer ambiguity vector 840 is correct (e.g., with a threshold level of confidence). As stage 860, the integer ambiguity unit 560 may determine whether the fixed integer ambiguity vector 840 is correct, e.g., by determining whether a probability of the fixed integer ambiguity vector 840 being correct exceeds a threshold probability. If the integer ambiguity unit 560 determines at stage 860 that the fixed integer ambiguity vector 840 is incorrect (or at least not correct), then the method 800 ends at stage 870 (with the RTK float solution possibly being used as the position estimate for the UE 500). If the integer ambiguity unit 560 determines at stage 860 that the fixed integer ambiguity vector 840 is correct, then the method 800 proceeds to stage 880 where the positioning unit 550 uses the fixed integer ambiguity vector 840 as a constraint on the RTK float solution to produce an RTK fixed solution position estimate 890 for the UE 500.

If a traditional, non-learning algorithm is used to validate an integer ambiguity solution, the algorithm may become overly complex in order to achieve a desired level of integer ambiguity validation accuracy. For example, a traditional, non-learning algorithm may use multiple logical tests, each with a corresponding threshold, to attempt to validate an integer ambiguity solution. It may be challenging to maintain/tune the threshold for each of the logical tests, and correlation between the logical tests increases the complexity exponentially with new logical tests.

The integer ambiguity unit 560 may provide a machine learning (ML) algorithm for integer ambiguity validation. Using ML for integer ambiguity validation may allow the integer ambiguity unit 560 to provide integer ambiguity validation with much less complexity than a non-learning algorithm for maintenance and/or performance tuning while validation logic grows. Using ML for integer ambiguity validation may result in better performance of integer ambiguity validation than using a non-learning algorithm (e.g., with one or more better performance metric values (KPI values (Key Performance Indicator values)). The integer ambiguity unit 560 may be configured to provide a flexible balance between a fixing rate (KPI for availability) and incorrect fix rate (KPI for reliability). For example, the integer ambiguity unit 560 may obtain (e.g., determine or receive) a probability threshold for a classification probability (e.g., probability of an integer ambiguity vector being correct) to meet, e.g., to be determined to be correct. Different values of the probability threshold used may result in different combinations of fixing rate and incorrect fix rate. Different probability threshold values may be used, for example, for different applications that may have different tolerances for fixing rate and/or incorrect fix rate. For example, a "lost my device" application may not be very sensitive to a higher incorrect fix rate, and may thus accept a higher fixing rate and a corresponding higher incorrect fix rate. For life-critical applications, such as automotive guidance, a very low incorrect fix rate may be required, and therefore such applications may use a lower fixing rate with a corresponding lower incorrect fix rate.

Figure 9:
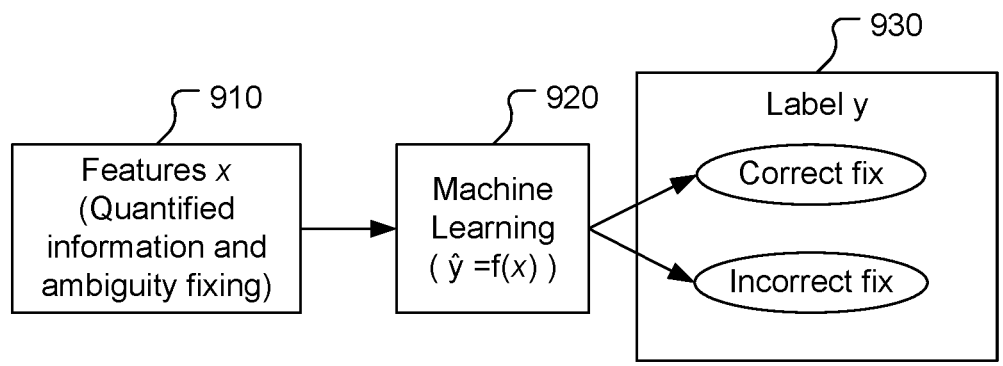
FIG. 9 is a block diagram of machine-learning-based fixed integer ambiguity classification.

Referring also to FIG. 9, the integer ambiguity unit 560 may use a set of features 910 (quantified information and ambiguity fixing (a set x of features)) as input to a machine learning algorithm 920 ($\hat{y}=f(x)$) to produce a classification output 930 (label y). In this example, the classifications are a correct fix (correct integer ambiguity vector) or an incorrect fix (incorrect integer ambiguity vector). The features 910 are information derived from SV signal measurements (processed SV signal measurements) and that are indicative, alone or in combination, of whether a corresponding integer ambiguity fix is correct. Various features may be used. For example, the features 910 may include a search ratio (e.g., a LAMBDA ratio), a float to fixed position change, a pseudorange yield rate, a carrier phase validity rate, a strong SV signal rate, a multi-band system count, a multi-band signal rate, a success rate, a close integer rate, a double-difference ambiguity vector size, an ambiguity PDOP (Position Dilution of Precision), and/or a baseline length. The search ratio is a ratio of the best integer ambiguity vector found by the search and the second-best integer ambiguity vector found by the search. The float to fixed position change is the position difference between the integer ambiguity float solution and the integer ambiguity fixed solution. The pseudorange yield rate is a rate (e.g., a percentage) of SVs with valid pseudoranges compared to an expected SV count. The carrier phase validity rate is a valid carrier phase count compared to a valid pseudorange count. The strong SV signal rate is a rate (e.g., a percentage) of SV signal measurements with a carrier-to-noise-density ratio ($CN_0$) above a threshold value (e.g., 35 dBHz). The multi-band system count is a count of SPS constellations with multi-band SV signals. The multi-band signal rate is a rate (e.g., a percentage) of observed SV with multi-band (MB) signals. The success rate is statistical probability, that the fixed integer ambiguity vector is correct. The close integer rate is a rate (e.g., a percentage) of ambiguity values from ambiguity-fixed solutions that are within a threshold (e.g., 0.15 cycles) of an integer number of cycles. The ambiguity PDOP is a PDOP value computed using measurements with fixed ambiguities. The baseline length is a distance between a base and the UE 500. For RTK, the base may be a physical terrestrial base station or a virtual base station. The position of the base station will be known to the device under test such that a baseline length between the base station and the device under test may be computed.

Figure 10:
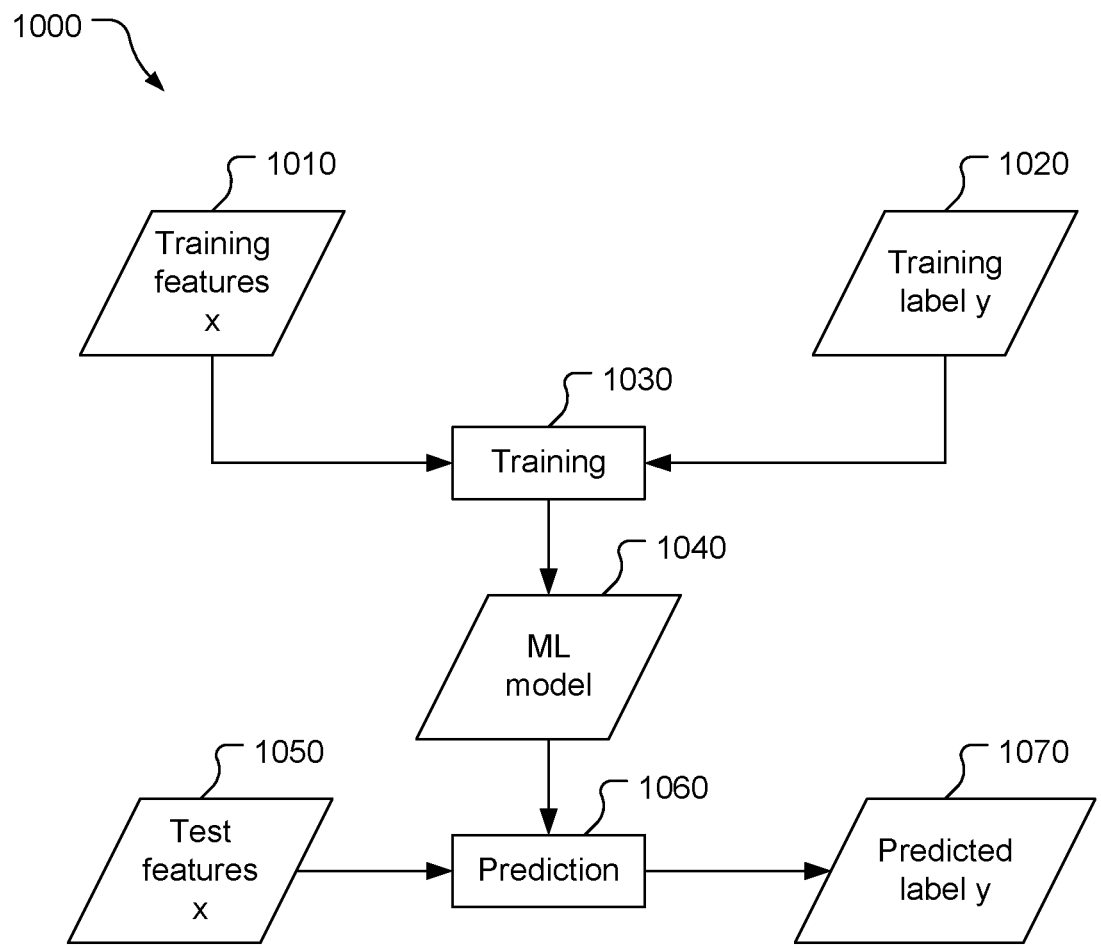
FIG. 10 is a block diagram of integer ambiguity vector validation.

Referring also to FIG. 10, a method 1000 of integer ambiguity vector validation includes the stages shown. The integer ambiguity unit 560 may use training features 1010 and corresponding training labels 1020 at stage 1030 to train an algorithm to produce an ML model 1040 that can be used to classify integer ambiguity vectors corresponding to features sets as either correct or incorrect. Various ML models may be used for the ML model 1040, e.g., a neural network, decision trees, etc. The training labels 1020 may be based on ground truth for the correct integer numbers of cycles, of respective carrier signals, between respective SVs and the UE 500. With the ML model 1040 trained, the integer ambiguity unit 560 may use test features 1050 as inputs to the ML model 1040 to perform prediction at stage 1060, yielding a predicted label 1070 for each set of test features, here a classification of correct or incorrect for each integer ambiguity vector. The test features 1050 and the predicted labels 1070 may be fed back to further train the ML model 1040, with a test feature set and corresponding predicted label being rejected if a corresponding ambiguity fixed solution for UE location differs by more than a threshold (e.g., 0.5 m) from a ground truth location of the UE 500.

One or more of various KPIs may be used to evaluate classification performance of the integer ambiguity unit 560, e.g., implementing an ML algorithm to classify fixed integer ambiguity vectors. For example, an ML confusion metric may be obtained by comparing predicted classifications with actual (ground truth) classifications. A prediction of an incorrect fixed integer ambiguity vector for a fixed integer ambiguity vector that is incorrect is called a true negative (TN). A prediction of an incorrect fixed integer ambiguity vector for a fixed integer ambiguity vector that is correct is called a false negative (FN), which is a type II error. A prediction of a correct fixed integer ambiguity vector for a fixed integer ambiguity vector that is incorrect is called a false positive (FP), which is a type I error. A prediction of a correct fixed integer ambiguity vector for a fixed integer ambiguity vector that is correct is called a true positive (TP). Using the confusion metrics, one or more KPIs may be produced. For example, a precision KPI may be given by $$KPI_p = TP/(TP+FP) \qquad (3)$$

where TP is the total number of true positives determined for a group of feature sets, and FP is the total number of false positives determined for the group of feature sets. The precision KPI shown in Equation (3) equals the total number of true positives determined for the group of feature sets divided by the sum of the total number of true positives determined for the group of feature sets and the total number of false positives determined for the group of feature sets. The precision KPI may be used in situations where false positives are of higher concern. As another example, a recall/sensitivity KPI may be given by $$KPI_{r/s} = TP/(TP+FN) \qquad (4)$$

where FN is the total number of false negatives determined for the group of feature sets. The recall/sensitivity KPI shown in Equation (4) equals the total number of true positives determined for the group of feature sets divided by the sum of the total number of true positives determined for the group of feature sets and the total number of false negatives determined for the group of feature sets. The recall/sensitivity KPI may be used in situations where false negatives are of higher concern. As another example, an F1-score KPI may be given by $$KPI_{F1} = (2 * KPI_{r/s} * KPI_p)/(KPI_{r/s} + KPI_p) \quad (5)$$

The F1-score KPI is a harmonic mean of the precision KPI and the recall/sensitivity KPI. Each of the KPIs provided by Equations (3)-(5) has a value between 0 and 1, with any score within a threshold (e.g., of 0.15) of 1 being considered good or acceptable. ML algorithm performance often involves a tradeoff between precision and recall.

A fixing rate KPI and an incorrect fix rate KPI may be used to determine performance of an ML-based algorithm for classification of integer ambiguity vectors for integer ambiguity validation. A fixing rate KPI may be defined as $$\text{Fixing rate} = (TP + FP)/(TN + FN + FP + TP) \quad (6)$$

where TN is the total number of true negatives determined for the group of feature sets. The fixing rate KPI shown in Equation (6) equals the sum of the total numbers of true positives and false positives determined for the group of feature sets divided by the sum of the total numbers of true negatives, false negatives, false positives, and true positives determined for the group of feature sets. An incorrect fix rate KPI may be defined as $$\text{Incorrect fix rate} = FP/(FP + TP) \quad (7)$$

The incorrect fix rate is one minus the precision KPI shown in Equation (3) and is a false discovery rate. Thus, if the incorrect fix rate is reduced, the precision KPI will be higher and the recall/sensitivity KPI will be lower such that there is a tradeoff between incorrect fix rate and recall/sensitivity.

Figure 11:
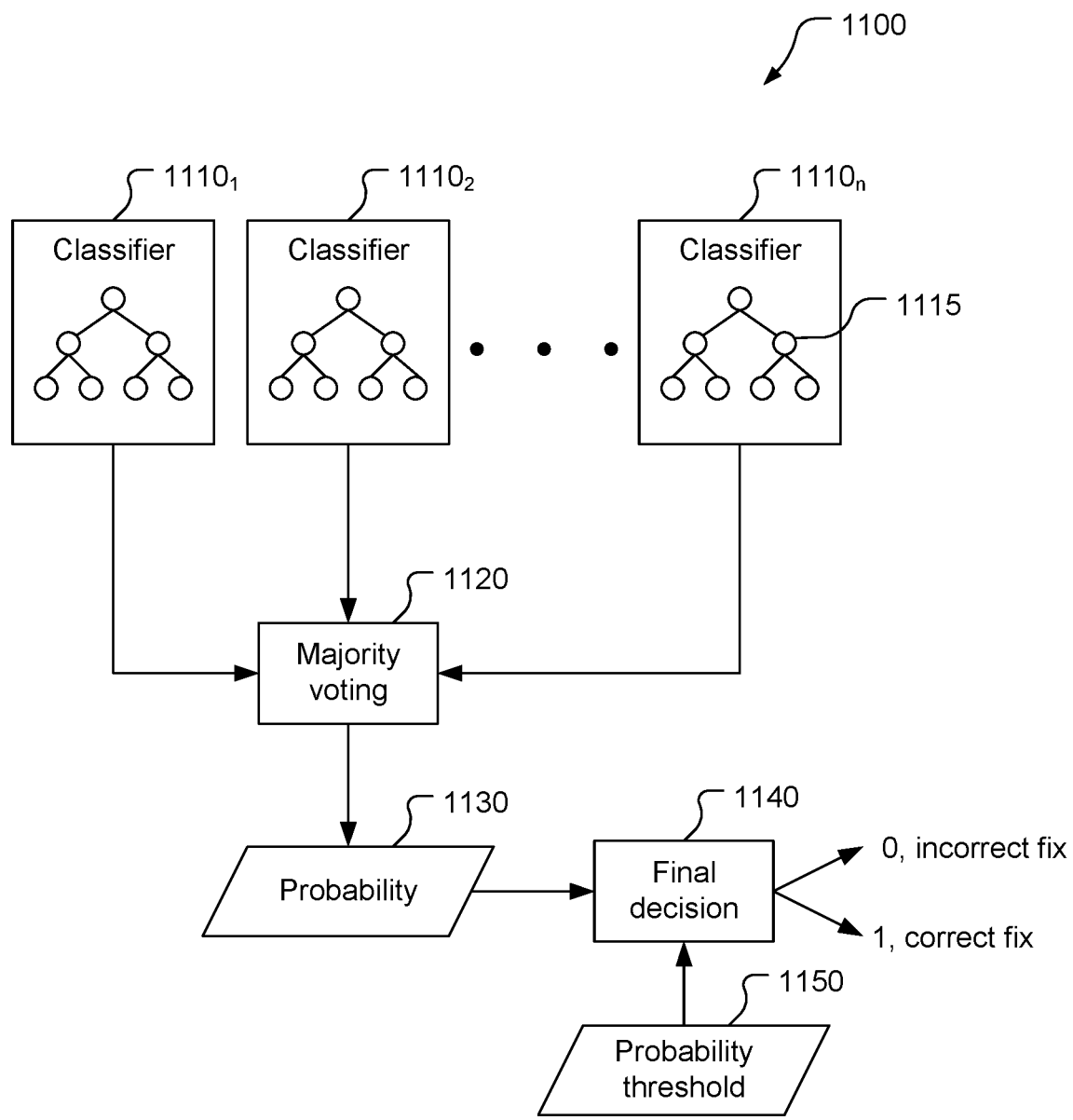
FIG. 11 is a block diagram of a machine learning model for integer ambiguity vector validation.

Referring also to FIG. 11, the ML model 1040 implemented by the integer ambiguity unit 560 may provide a classification probability (rather than an absolute 0 or 1 classification). For example, an ML model 1100 comprises multiple decision-tree classifiers $1110_1, 1110_2, \ldots, 1110_n$. Each decision 1115 in each of the classifiers $1110_1$-$1110_n$ comprises a yes/no decision, e.g., based on a comparison of a feature value with a corresponding feature value threshold. The respective decision tree moves to one subsequent decision if the feature value is less than or equal to the threshold and moves to another subsequent decision if the feature value is more than the threshold. Different ones of the classifiers $1110_1$-$1110_n$ may use the same set of features but with one or more different feature value thresholds (e.g., the LAMBDA ratio threshold in the classifier $1110_1$ being different from the LAMBDA ratio threshold in the classifier $1110_2$). Each of the classifiers $1110_1$-$1110_n$ may provide a classification probability, e.g., a value between 0 and 1 that the fixed integer ambiguity vector, corresponding to the feature values provided to the classifiers $1110_1$-$1110_n$, is correct. The integer ambiguity unit 560 may perform majority voting at stage 1120 using the probabilities output by the classifiers $1110_1$-$1110_n$ to determine a probability 1130 of the integer ambiguity vector being correct. The probability 1130 may be considered to be an aggregate or final probability based on the interim probabilities provided by the classifiers $1110_1$-$1110_n$.

At stage 1140, the integer ambiguity unit 560 may compare the probability 1130 of the fixed integer ambiguity vector (e.g., the vector 840) being correct with a probability threshold 1150. The integer ambiguity unit 560 may obtain the probability threshold 1150 in any of a variety of manners (or a combination of manners). For example, the integer ambiguity unit 560 may receive the probability threshold 1150 via the interface 520 (e.g., via a wireless receiver from an entity external to the UE 500). As another example, the integer ambiguity unit 560 may receive the probability threshold 1150 via the interface 520 from another portion of the UE 500, e.g., from an application requesting a position estimate for the UE 500. Applications may include, for example, an autonomous driving application, a lost device locating application, a navigation application (e.g., for a pedestrian or a driver), a geofencing application, an emergency service application, a location-based advertising application, a fitness/health application, an asset tracking application, a location-based gaming application, a public safety and security application, a high-definition map update, etc.

The integer ambiguity unit 560 may output a final correct/incorrect decision based on the comparison of the probability 1130 of the fixed integer ambiguity vector (e.g., the vector 840) being correct with the probability threshold 1150. The integer ambiguity unit 560 may output a decision of "correct" based on the probability 1130 of the fixed integer ambiguity vector being correct being higher than or equal to the probability threshold 1150. The integer ambiguity unit 560 may output a decision of "incorrect" otherwise (based on the probability 1130 of the fixed integer ambiguity vector being correct being less than the probability threshold 1150). The probability threshold 1150 will affect the fixing rate and the incorrect fix rate. Consequently, the ML model 1100 may provide flexibility to balance the fixing rate and the incorrect fix rate.

Simulations have shown that a balance between fixing rate and incorrect fix rate may be set as desired by selecting the probability threshold. Thirty two (32) logs spanning about 36 hours with a data rate of 1 Hz were collected. A positioning engine was reset every 30 seconds such that multiple records with different subsets of ambiguity search settings were used to determine integer ambiguity vectors. Feature sets were determined from SV signal measurements and about 70% of the feature sets were used for training and about 30% of the feature sets were used for prediction/test. The training feature sets were selected from the available feature sets in a variety of ways, e.g., a first 30% of the available feature sets, a middle 30% of the available feature sets, a final 30% of the available feature sets, or 30% selected from feature sets throughout the available feature sets. Still other techniques for selecting training feature sets may be used (and/or another quantity of training feature sets from the available feature sets). Using ML-based ambiguity validation proved to have comparable or even better performance (accuracy) than non-learning-algorithm-based ambiguity validation, and provided a balancing between fixing rate and incorrect fix rate. For example, with a probability threshold of 0.99, a fixing rate of 55.65% and an incorrect fix rate of 0.04% were observed. With a probability threshold of 0.975, a fixing rate of 65.20% and an incorrect fix rate of 0.18% were observed. With a probability threshold of 0.95, a fixing rate of 72.04% and an incorrect fix rate of 0.38% were observed. With a probability threshold of 0.90, a fixing rate of 74.70% and an incorrect fix rate of 0.36% were observed. With a non-learning algorithm for ambiguity validation, a fixing rate of 51.22% and an incorrect fix rate of 0.07% were observed.

Figure 12:
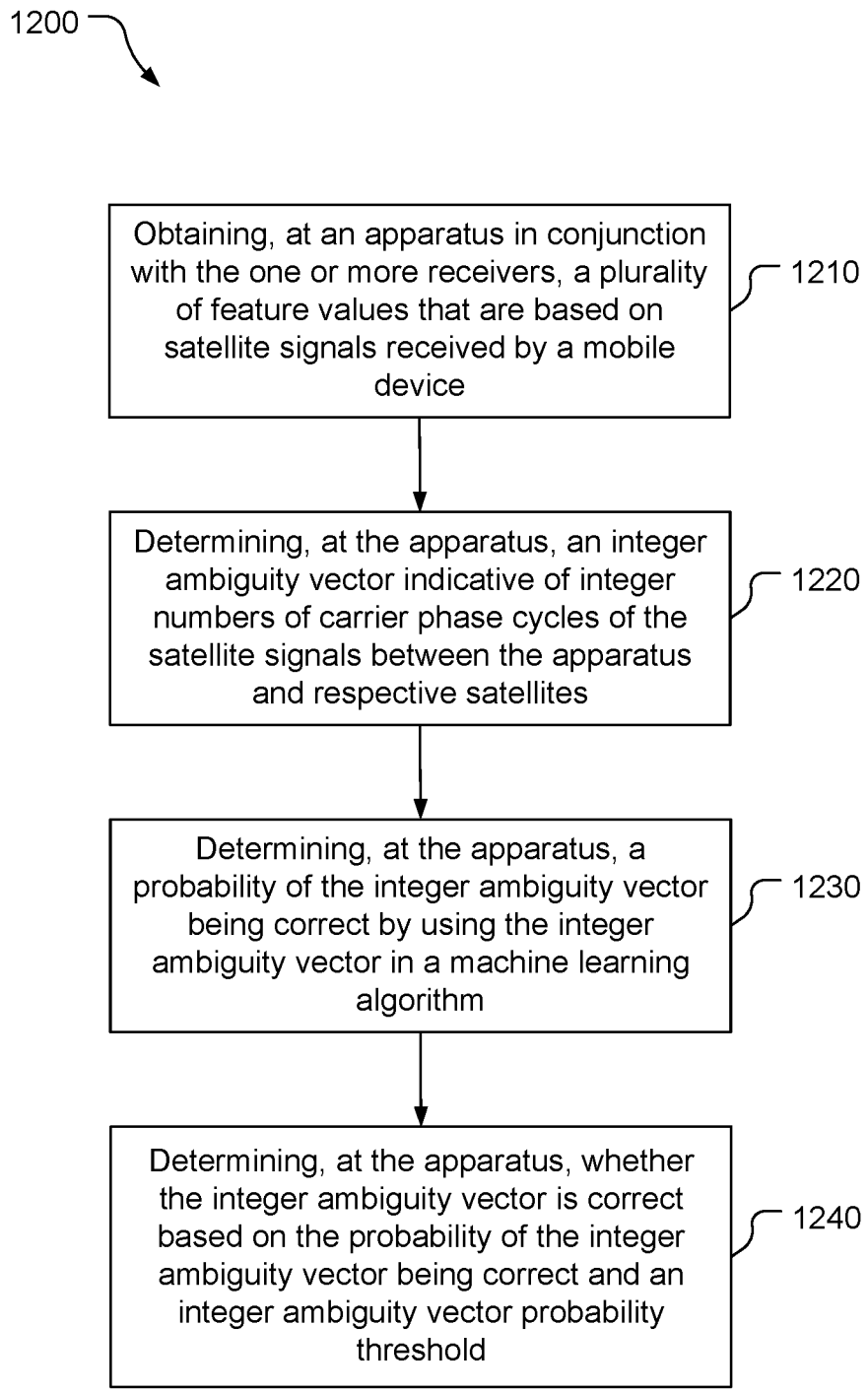
FIG. 12 is a block flow diagram of an integer ambiguity validation method.

Referring to FIG. 12, with further reference to FIGS. 1-11, an integer ambiguity validation method 1200 includes the stages shown. The method 1200 is, however, an example only and not limiting. The method 1200 may be altered, e.g., by having stages added, removed, rearranged, combined, performed concurrently, and/or having single stages split into multiple stages. While the discussion below often focuses on the UE 500, other apparatus may be used to implement the method 1200.

At stage 1210, the method 1200 includes obtaining, at an apparatus in conjunction with the one or more receivers, a plurality of feature values that are based on satellite signals received by a mobile device. For example, the integer ambiguity unit 560 may receive a feature vector based on SV signals received via the interface 520 (e.g., the SPS receiver 217 and the SPS antenna 262) and processed by one or more processors (e.g., of the SPS receiver 217). The processor(s) 510, possibly including the memory(ies) 530, in combination with the interface(s) 520 (e.g., the SPS receiver 217 and the SPS antenna 262) may comprise means for obtaining the plurality of feature values. As another example, an apparatus (e.g., a server) may receive a feature vector from the UE 500. As another example, an apparatus (e.g., a server) may receive SV signal measurements, process the SV signal measurements into a feature vector, and the feature vector may be provided by one or more processors of the apparatus to (and received by) one or more processors of the apparatus.

At stage 1220, the method 1200 includes determining, at the apparatus, an integer ambiguity vector indicative of integer numbers of carrier phase cycles of the satellite signals between the apparatus and respective satellites. For example, the integer ambiguity unit 560 may determine the fixed integer ambiguity vector 840. The processor(s) 510, possibly in combination with the memory(ies) 530, may comprise means for determining the integer ambiguity vector. As another example, an apparatus external to the UE 500 (e.g., a server) may determine the integer ambiguity vector.

At stage 1230, the method 1200 includes determining, at the apparatus, a probability of the integer ambiguity vector being correct by using the integer ambiguity vector in a machine learning algorithm. For example, the integer ambiguity unit 560 may determine the probability 1130 based on the fixed integer ambiguity vector 840 (e.g., as applied to the classifiers $1110_1$-$1110_n$). The processor(s) 510, possibly in combination with the memory(ies) 530, may comprise means for determining the probability of the integer ambiguity vector being correct. As another example, an apparatus external to the UE 500 (e.g., a server) may determine the probability of the integer ambiguity vector being correct.

At stage 1240, the method 1200 includes determining, at the apparatus, whether the integer ambiguity vector is correct based on the probability of the integer ambiguity vector being correct and an integer ambiguity vector probability threshold. For example, the integer ambiguity unit 560 may compare the probability 1130 with the probability threshold 1150 to determine whether the integer ambiguity vector is correct. The processor(s) 510, possibly in combination with the memory(ies) 530, may comprise means for determining whether the integer ambiguity vector is correct. As another example, an apparatus external to the UE 500 (e.g., a server) may determine whether the integer ambiguity vector is correct.

Implementations of the method 1200 may include one or more of the following features. In an example implementation, the method 1200 includes receiving, at the apparatus, the integer ambiguity vector probability threshold at least one of: via one or more receivers of the apparatus; or via one or more interfaces of the apparatus at one or more processors of the apparatus. For example, one or more processors of the UE 500 (or another apparatus) may receive the integer ambiguity vector probability threshold from an external and/or an internal source. For example, one or more processors of the UE 500 may receive the integer ambiguity vector probability threshold via the interface 520, e.g., the receiver 244 and/or the receiver 254, and/or may receive the integer ambiguity vector probability threshold internally from one or more processors of the UE 500 via the interface 520. The processor(s) 510, possibly including the memory (ies) 530, in combination with the interface(s) 520 (e.g., the receiver 244 and/or the receiver 254) may comprise means for receiving the integer ambiguity vector probability threshold. In a further example implementation, receiving the integer ambiguity vector probability threshold comprises receiving the integer ambiguity vector probability threshold from one or more applications via the one or more interfaces. For example, one or more processors of the UE 500 may receive the integer ambiguity vector probability threshold from one or more location-based applications requesting a location of the UE 500.

Also to alternatively, implementations of the method 1200 may include one or more of the following features. In an example implementation, the method 1200 includes determining the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector. For example, the integer ambiguity unit 560 may determine the integer ambiguity vector probability threshold (e.g., retrieving the integer ambiguity vector probability threshold from a look-up table in the memory(ies) 530) based on an application from which a request for a location of the UE 500 is received. The processor(s) 510, possibly in combination with the memory(ies) 530, may comprise means for determining the integer ambiguity vector probability threshold. In another example implementation, determining the probability of the integer ambiguity vector being correct comprises performing majority voting on a plurality of correct/incorrect classifications of a plurality of classifier models each providing a respective integer ambiguity correctness probability based on a plurality of features corresponding to satellite signal measurements. For example, the integer ambiguity unit 560 may perform majority voting at stage 1120 using probabilities provided by the classifiers $1110_1$-$1110_n$. In a further example implementation, the plurality of features corresponding to the satellite signal measurements comprise at least two of: a ratio test; a float position estimate to fixed position estimate difference; a pseudorange yield rate; a carrier phase validity rate; a strong signal percentage; a quantity of satellite vehicle constellations with multi-band signals from which at least some of the satellite signal measurements are obtained; a percentage of satellite vehicles, from which the satellite signal measurements are obtained, that transmit multi-band satellite signals; a percentage of float integer values within a threshold of an integer; a size of a double-difference ambiguity vector; a position dilution of precision based on at least of subset of the satellite signal measurements that have fixed ambiguities; or a baseline length.

Implementation Examples

Implementation examples are provided in the following numbered clauses.

Clause 1. An apparatus comprising:
one or more memories;
one or more receivers; and
one or more processors communicatively coupled to the one or more memories and the one or more receivers, the one or more processors being configured to:
obtain, in conjunction with the one or more receivers, a plurality of feature values that are based on satellite signals received by a mobile device;
determine an integer ambiguity vector indicative of integer numbers of carrier phase cycles of the satellite signals between the apparatus and respective satellites;
determine a probability of the integer ambiguity vector being correct by using the integer ambiguity vector in a machine learning algorithm; and
determine whether the integer ambiguity vector is correct based on the probability of the integer ambiguity vector being correct and an integer ambiguity vector probability threshold.

Clause 2. The apparatus of clause 1, wherein the one or more processors are configured to receive the integer ambiguity vector probability threshold at least one of: via the one or more receivers; or via one or more interfaces, of the apparatus, communicatively coupled to the one or more processors.

Clause 3. The apparatus of clause 2, wherein the one or more processors are configured to receive the integer ambiguity vector probability threshold from one or more applications via the one or more interfaces.

Clause 4. The apparatus of clause 1, wherein the one or more processors are configured to determine the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

Clause 5. The apparatus of clause 1, wherein to determine the probability of the integer ambiguity vector being correct, the one or more processors are configured to perform majority voting on a plurality of correct/incorrect classifications of a plurality of classifier models each providing a respective integer ambiguity correctness probability based on a plurality of features corresponding to satellite signal measurements.

Clause 6. The apparatus of clause 5, wherein the plurality of features corresponding to the satellite signal measurements comprise at least two of:
a ratio test;
a float position estimate to fixed position estimate difference;
a pseudorange yield rate;
a carrier phase validity rate;
a strong signal percentage;
a quantity of satellite vehicle constellations with multiband signals from which at least some of the satellite signal measurements are obtained;
a percentage of satellite vehicles, from which the satellite signal measurements are obtained, that transmit multiband satellite signals;
a percentage of float integer values within a threshold of an integer;
a size of a double-difference ambiguity vector;
a position dilution of precision based on at least of subset of the satellite signal measurements that have fixed ambiguities; or
a baseline length.

Clause 7. An integer ambiguity validation method comprising:
obtaining, at an apparatus in conjunction with the one or more receivers, a plurality of feature values that are based on satellite signals received by a mobile device;
determining, at the apparatus, an integer ambiguity vector indicative of integer numbers of carrier phase cycles of the satellite signals between the apparatus and respective satellites;
determining, at the apparatus, a probability of the integer ambiguity vector being correct by using the integer ambiguity vector in a machine learning algorithm; and
determining, at the apparatus, whether the integer ambiguity vector is correct based on the probability of the integer ambiguity vector being correct and an integer ambiguity vector probability threshold.

Clause 8. The integer ambiguity validation method of clause 7, further comprising receiving, at the apparatus, the integer ambiguity vector probability threshold at least one of: via one or more receivers of the apparatus; or via one or more interfaces of the apparatus at one or more processors of the apparatus.

Clause 9. The integer ambiguity validation method of clause 8, wherein receiving the integer ambiguity vector probability threshold comprises receiving the integer ambiguity vector probability threshold from one or more applications via the one or more interfaces.

Clause 10. The integer ambiguity validation method of clause 7, further comprising determining the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

Clause 11. The integer ambiguity validation method of clause 7, wherein determining the probability of the integer ambiguity vector being correct comprises performing majority voting on a plurality of correct/incorrect classifications of a plurality of classifier models each providing a respective integer ambiguity correctness probability based on a plurality of features corresponding to satellite signal measurements.

Clause 12. The integer ambiguity validation method of clause 11, wherein the plurality of features corresponding to the satellite signal measurements comprise at least two of:
a ratio test;
a float position estimate to fixed position estimate difference;
a pseudorange yield rate;
a carrier phase validity rate;
a strong signal percentage;
a quantity of satellite vehicle constellations with multiband signals from which at least some of the satellite signal measurements are obtained;
a percentage of satellite vehicles, from which the satellite signal measurements are obtained, that transmit multiband satellite signals;
a percentage of float integer values within a threshold of an integer;

a size of a double-difference ambiguity vector;
a position dilution of precision based on at least of subset of the satellite signal measurements that have fixed ambiguities; or
a baseline length.

Clause 13. An apparatus comprising:
means for obtaining, in conjunction with the one or more receivers, a plurality of feature values that are based on satellite signals received by a mobile device;
means for determining an integer ambiguity vector indicative of integer numbers of carrier phase cycles of the satellite signals between the apparatus and respective satellites;
means for determining a probability of the integer ambiguity vector being correct by using the integer ambiguity vector in a machine learning algorithm; and
means for determining whether the integer ambiguity vector is correct based on the probability of the integer ambiguity vector being correct and an integer ambiguity vector probability threshold.

Clause 14. The apparatus of clause 13, further comprising means for receiving the integer ambiguity vector probability threshold at least one of: from an entity external to the apparatus; or at a first device from a second device internal to the apparatus.

Clause 15. The apparatus of clause 14, wherein the means for receiving the integer ambiguity vector probability threshold comprise means for receiving the integer ambiguity vector probability threshold from the second device corresponding to one or more applications run by the second device.

Clause 16. The apparatus of clause 13, further comprising means for determining the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

Clause 17. The apparatus of clause 13, wherein the means for determining the probability of the integer ambiguity vector being correct comprise means for performing majority voting on a plurality of correct/incorrect classifications of a plurality of classifier models each providing a respective integer ambiguity correctness probability based on a plurality of features corresponding to satellite signal measurements.

Clause 18. The apparatus of clause 17, wherein the plurality of features corresponding to the satellite signal measurements comprise at least two of:
a ratio test;
a float position estimate to fixed position estimate difference;
a pseudorange yield rate;
a carrier phase validity rate;
a strong signal percentage;
a quantity of satellite vehicle constellations with multi-band signals from which at least some of the satellite signal measurements are obtained;
a percentage of satellite vehicles, from which the satellite signal measurements are obtained, that transmit multi-band satellite signals;
a percentage of float integer values within a threshold of an integer;
a size of a double-difference ambiguity vector;
a position dilution of precision based on at least of subset of the satellite signal measurements that have fixed ambiguities; or
a baseline length.

Clause 19. A non-transitory, processor-readable storage medium comprising processor-readable instructions to cause one or more processors, of an apparatus, to:
obtain, in conjunction with the one or more receivers, a plurality of feature values that are based on satellite signals received by a mobile device;
determine an integer ambiguity vector indicative of integer numbers of carrier phase cycles of the satellite signals between the apparatus and respective satellites;
determine a probability of the integer ambiguity vector being correct by using the integer ambiguity vector in a machine learning algorithm; and
determine whether the integer ambiguity vector is correct based on the probability of the integer ambiguity vector being correct and an integer ambiguity vector probability threshold.

Clause 20. The non-transitory, processor-readable storage medium of clause 19, further comprising processor-readable instructions to cause the one or more processors to receive the integer ambiguity vector probability threshold at least one of: from an entity external to the apparatus; or at a first device from a second device internal to the apparatus.

Clause 21. The non-transitory, processor-readable storage medium of clause 20, wherein the processor-readable instructions to cause the one or more processors to receive the integer ambiguity vector probability threshold comprise processor-readable instructions to cause the one or more processors to receive the integer ambiguity vector probability threshold from the second device corresponding to one or more applications run by the second device.

Clause 22. The non-transitory, processor-readable storage medium of clause 19, further comprising processor-readable instructions to cause the one or more processors to determine the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

Clause 23. The non-transitory, processor-readable storage medium of clause 19, wherein the processor-readable instructions to cause the one or more processors to determine the probability of the integer ambiguity vector being correct comprise processor-readable instructions to cause the one or more processors to perform majority voting on a plurality of correct/incorrect classifications of a plurality of classifier models each providing a respective integer ambiguity correctness probability based on a plurality of features corresponding to satellite signal measurements.

Clause 24. The non-transitory, processor-readable storage medium of clause 23, wherein the plurality of features corresponding to the satellite signal measurements comprise at least two of:
a ratio test;
a float position estimate to fixed position estimate difference;
a pseudorange yield rate;
a carrier phase validity rate;
a strong signal percentage;

a quantity of satellite vehicle constellations with multi-band signals from which at least some of the satellite signal measurements are obtained;

a percentage of satellite vehicles, from which the satellite signal measurements are obtained, that transmit multi-band satellite signals;

a percentage of float integer values within a threshold of an integer;

a size of a double-difference ambiguity vector;

a position dilution of precision based on at least of subset of the satellite signal measurements that have fixed ambiguities; or a baseline length.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
   one or more memories;
   one or more receivers; and
   one or more processors communicatively coupled to the one or more memories and the one or more receivers, the one or more processors being configured to:
     obtain, in conjunction with the one or more receivers, a plurality of feature values that are based on satellite signals received by a mobile device;
     determine an integer ambiguity vector indicative of integer numbers of carrier phase cycles of the satellite signals between the apparatus and respective satellites;
     determine a probability of the integer ambiguity vector being correct by using the integer ambiguity vector in a machine learning algorithm; and
     determine whether the integer ambiguity vector is correct based on the probability of the integer ambiguity vector being correct and an integer ambiguity vector probability threshold.

2. The apparatus of claim 1, wherein the one or more processors are configured to receive the integer ambiguity vector probability threshold at least one of: via the one or more receivers; or via one or more interfaces, of the apparatus, communicatively coupled to the one or more processors.

3. The apparatus of claim 2, wherein the one or more processors are configured to receive the integer ambiguity vector probability threshold from one or more applications via the one or more interfaces.

4. The apparatus of claim 1, wherein the one or more processors are configured to determine the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

5. The apparatus of claim 1, wherein to determine the probability of the integer ambiguity vector being correct, the one or more processors are configured to perform majority voting on a plurality of correct/incorrect classifications of a plurality of classifier models each providing a respective integer ambiguity correctness probability based on a plurality of features corresponding to satellite signal measurements.

6. The apparatus of claim 5, wherein the plurality of features corresponding to the satellite signal measurements comprise at least two of:
   a ratio test;
   a float position estimate to fixed position estimate difference;
   a pseudorange yield rate;
   a carrier phase validity rate;
   a strong signal percentage;
   a quantity of satellite vehicle constellations with multi-band signals from which at least some of the satellite signal measurements are obtained;
   a percentage of satellite vehicles, from which the satellite signal measurements are obtained, that transmit multi-band satellite signals;
   a percentage of float integer values within a threshold of an integer;
   a size of a double-difference ambiguity vector;
   a position dilution of precision based on at least of subset of the satellite signal measurements that have fixed ambiguities; or
   a baseline length.

7. An integer ambiguity validation method comprising:
   obtaining, at an apparatus in conjunction with the one or more receivers, a plurality of feature values that are based on satellite signals received by a mobile device;
   determining, at the apparatus, an integer ambiguity vector indicative of integer numbers of carrier phase cycles of the satellite signals between the apparatus and respective satellites;

determining, at the apparatus, a probability of the integer ambiguity vector being correct by using the integer ambiguity vector in a machine learning algorithm; and
determining, at the apparatus, whether the integer ambiguity vector is correct based on the probability of the integer ambiguity vector being correct and an integer ambiguity vector probability threshold.

8. The integer ambiguity validation method of claim 7, further comprising receiving, at the apparatus, the integer ambiguity vector probability threshold at least one of: via one or more receivers of the apparatus; or via one or more interfaces of the apparatus at one or more processors of the apparatus.

9. The integer ambiguity validation method of claim 8, wherein receiving the integer ambiguity vector probability threshold comprises receiving the integer ambiguity vector probability threshold from one or more applications via the one or more interfaces.

10. The integer ambiguity validation method of claim 7, further comprising determining the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

11. The integer ambiguity validation method of claim 7, wherein determining the probability of the integer ambiguity vector being correct comprises performing majority voting on a plurality of correct/incorrect classifications of a plurality of classifier models each providing a respective integer ambiguity correctness probability based on a plurality of features corresponding to satellite signal measurements.

12. The integer ambiguity validation method of claim 11, wherein the plurality of features corresponding to the satellite signal measurements comprise at least two of:
 a ratio test;
 a float position estimate to fixed position estimate difference;
 a pseudorange yield rate;
 a carrier phase validity rate;
 a strong signal percentage;
 a quantity of satellite vehicle constellations with multi-band signals from which at least some of the satellite signal measurements are obtained;
 a percentage of satellite vehicles, from which the satellite signal measurements are obtained, that transmit multi-band satellite signals;
 a percentage of float integer values within a threshold of an integer;
 a size of a double-difference ambiguity vector;
 a position dilution of precision based on at least of subset of the satellite signal measurements that have fixed ambiguities; or
 a baseline length.

13. An apparatus comprising:
 means for obtaining, in conjunction with the one or more receivers, a plurality of feature values that are based on satellite signals received by a mobile device;
 means for determining an integer ambiguity vector indicative of integer numbers of carrier phase cycles of the satellite signals between the apparatus and respective satellites;
 means for determining a probability of the integer ambiguity vector being correct by using the integer ambiguity vector in a machine learning algorithm; and
 means for determining whether the integer ambiguity vector is correct based on the probability of the integer ambiguity vector being correct and an integer ambiguity vector probability threshold.

14. The apparatus of claim 13, further comprising means for receiving the integer ambiguity vector probability threshold at least one of: from an entity external to the apparatus; or at a first device from a second device internal to the apparatus.

15. The apparatus of claim 14, wherein the means for receiving the integer ambiguity vector probability threshold comprise means for receiving the integer ambiguity vector probability threshold from the second device corresponding to one or more applications run by the second device.

16. The apparatus of claim 13, further comprising means for determining the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

17. The apparatus of claim 13, wherein the means for determining the probability of the integer ambiguity vector being correct comprise means for performing majority voting on a plurality of correct/incorrect classifications of a plurality of classifier models each providing a respective integer ambiguity correctness probability based on a plurality of features corresponding to satellite signal measurements.

18. The apparatus of claim 17, wherein the plurality of features corresponding to the satellite signal measurements comprise at least two of:
 a ratio test;
 a float position estimate to fixed position estimate difference;
 a pseudorange yield rate;
 a carrier phase validity rate;
 a strong signal percentage;
 a quantity of satellite vehicle constellations with multi-band signals from which at least some of the satellite signal measurements are obtained;
 a percentage of satellite vehicles, from which the satellite signal measurements are obtained, that transmit multi-band satellite signals;
 a percentage of float integer values within a threshold of an integer;
 a size of a double-difference ambiguity vector;
 a position dilution of precision based on at least of subset of the satellite signal measurements that have fixed ambiguities; or
 a baseline length.

19. A non-transitory, processor-readable storage medium comprising processor-readable instructions to cause one or more processors, of an apparatus, to:
 obtain, in conjunction with the one or more receivers, a plurality of feature values that are based on satellite signals received by a mobile device;
 determine an integer ambiguity vector indicative of integer numbers of carrier phase cycles of the satellite signals between the apparatus and respective satellites;

determine a probability of the integer ambiguity vector being correct by using the integer ambiguity vector in a machine learning algorithm; and determine whether the integer ambiguity vector is correct based on the probability of the integer ambiguity vector being correct and an integer ambiguity vector probability threshold.

20. The non-transitory, processor-readable storage medium of claim 19, further comprising processor-readable instructions to cause the one or more processors to receive the integer ambiguity vector probability threshold at least one of: from an entity external to the apparatus; or at a first device from a second device internal to the apparatus.

21. The non-transitory, processor-readable storage medium of claim 20, wherein the processor-readable instructions to cause the one or more processors to receive the integer ambiguity vector probability threshold comprise processor-readable instructions to cause the one or more processors to receive the integer ambiguity vector probability threshold from the second device corresponding to one or more applications run by the second device.

22. The non-transitory, processor-readable storage medium of claim 19, further comprising processor-readable instructions to cause the one or more processors to determine the integer ambiguity vector probability threshold based on an application requesting a position of the apparatus, wherein a higher value of the integer ambiguity vector probability threshold corresponds to a lower fixing rate of the integer ambiguity vector and a lower incorrect fixing rate of the integer ambiguity vector, and a lower value of the integer ambiguity vector probability threshold corresponds to a higher fixing rate of the integer ambiguity vector and a higher incorrect fixing rate of the integer ambiguity vector.

23. The non-transitory, processor-readable storage medium of claim 19, wherein the processor-readable instructions to cause the one or more processors to determine the probability of the integer ambiguity vector being correct comprise processor-readable instructions to cause the one or more processors to perform majority voting on a plurality of correct/incorrect classifications of a plurality of classifier models each providing a respective integer ambiguity correctness probability based on a plurality of features corresponding to satellite signal measurements.

24. The non-transitory, processor-readable storage medium of claim 23, wherein the plurality of features corresponding to the satellite signal measurements comprise at least two of:
a ratio test;
a float position estimate to fixed position estimate difference;
a pseudorange yield rate;
a carrier phase validity rate;
a strong signal percentage;
a quantity of satellite vehicle constellations with multi-band signals from which at least some of the satellite signal measurements are obtained;
a percentage of satellite vehicles, from which the satellite signal measurements are obtained, that transmit multi-band satellite signals;
a percentage of float integer values within a threshold of an integer;
a size of a double-difference ambiguity vector;
a position dilution of precision based on at least of subset of the satellite signal measurements that have fixed ambiguities; or
a baseline length.

* * * * *